(12) United States Patent
Fisher

(10) Patent No.: US 12,727,597 B2
(45) Date of Patent: Sep. 8, 2026

(54) GAME LIFTING DEVICE

(71) Applicant: Barry Fisher, Glenville, PA (US)

(72) Inventor: Barry Fisher, Glenville, PA (US)

( * ) Notice: Subject to any disclaimer, the term of this patent is extended or adjusted under 35 U.S.C. 154(b) by 0 days.

(21) Appl. No.: 18/922,061

(22) Filed: Oct. 21, 2024

(65) Prior Publication Data

US 2025/0143286 A1 May 8, 2025

Related U.S. Application Data

(60) Provisional application No. 63/595,945, filed on Nov. 3, 2023.

(51) Int. Cl.
*A01M 31/00* (2006.01)

(52) U.S. Cl.
CPC .................................. *A01M 31/006* (2013.01)

(58) Field of Classification Search
CPC ........ A01B 43/00; A01M 31/006; B60R 9/06; B60R 9/065; B60R 5/04; B60R 9/055
USPC ................................ 414/462, 685, 721, 725
See application file for complete search history.

(56) References Cited

U.S. PATENT DOCUMENTS 3,431,662 A * 3/1969 Bles ........................ E01H 5/065 414/722
3,841,506 A * 10/1974 Smith ..................... B60P 3/127 280/402
3,976,213 A * 8/1976 Ball ...................... B60P 3/1025 414/549
4,403,432 A * 9/1983 Biance .................... E01H 5/068 172/445.2
4,806,063 A 2/1989 York
5,540,537 A 7/1996 Welch
5,564,720 A 10/1996 Stringer
5,595,007 A * 1/1997 Biance .................... E01H 5/068 172/445.2
5,975,831 A 11/1999 Martin
6,152,675 A 11/2000 Compton
6,238,171 B1 * 5/2001 Carter ..................... B60P 3/125 280/402
6,293,351 B1 * 9/2001 Schmidt .................. E01H 5/068 172/684.5
6,461,095 B1 * 10/2002 Puska ....................... B66F 9/06 414/917
6,607,345 B2 * 8/2003 McElhany ............ B60P 1/4407 414/471
6,769,858 B1 * 8/2004 Butler ....................... B60R 9/06 414/500
6,869,265 B2 * 3/2005 Smith .................. B60P 1/4407 414/546
7,293,951 B2 * 11/2007 Meeks .................. B60P 1/4407 414/547
7,997,015 B2 * 8/2011 Belzile ................... A01B 59/06 37/231

(Continued)

*Primary Examiner* — Gregory W Adams
(74) *Attorney, Agent, or Firm* — Saxton & Stump, LLC

(57) ABSTRACT

A portable game lifting device includes a receiver element for engagement with a vehicle. The receiver element includes a first end and a second end. A lift arm is pivotably attached to the first end of the receiver element via a pivot. A basket is mounted on a distal end of the lift arm from the pivot. The basket is configured to receive a load and a pulley assembly is arranged and disposed to actuate the lift arm to lift the load with the basket. A method for lifting a load with the portable game lifting device is also disclosed.

17 Claims, 8 Drawing Sheets

(56) References Cited

U.S. PATENT DOCUMENTS

| | | | | |
|---|---|---|---|---|
| 8,061,956 | B2 * | 11/2011 | Burenga | A01D 87/127<br>37/405 |
| 8,517,807 | B2 * | 8/2013 | Watson | A22B 7/006<br>452/187 |
| 9,327,947 | B2 | 5/2016 | Davis | |
| 10,384,617 | B1 * | 8/2019 | Keyser | B60R 9/06 |
| 2004/0048565 | A1 | 3/2004 | Homer, Sr. | |
| 2004/0079539 | A1 * | 4/2004 | Schmidt | A01B 59/06<br>172/439 |
| 2005/0254925 | A1 * | 11/2005 | Braquet | B60P 1/4492<br>414/462 |
| 2007/0196199 | A1 * | 8/2007 | Evans | B60P 1/4407<br>414/466 |
| 2008/0292435 | A1 * | 11/2008 | Turner | B60P 1/4407<br>414/462 |
| 2014/0271068 | A1 * | 9/2014 | Baumann | B60P 1/4407<br>414/469 |
| 2016/0339850 | A1 * | 11/2016 | Williams, Jr. | B60R 9/06 |
| 2023/0276787 | A1 | 9/2023 | Ross et al. | |

* cited by examiner

GAME LIFTING DEVICE

CROSS REFERENCE TO RELATED APPLICATIONS

This application is a non-provisional patent application claiming priority and benefit of U.S. Provisional Patent Application No. 63/595,945, filed Nov. 3, 2023, entitled "GAME LIFTING DEVICE", which is hereby incorporated by reference in its entirety.

FIELD OF THE INVENTION

The present disclosure is generally directed to a lifting device, particularly a lifting device for lifting loads, such as game animals.

BACKGROUND OF THE INVENTION

Hunting is a popular activity, which may be enjoyed as individuals or with a group of friends or family. However, game animals can be heavy, and lifting and transporting the game animal can be difficult or impossible, particularly when hunting alone or when the hunter does not have the assistance of others. A challenge many hunters encounter when hunting is loading the game animal into a vehicle and/or transporting the game animals with their vehicle. Hunters typically rely upon others to assist in the lifting and carrying of game animals.

Known systems for lifting and/or transporting game animals with vehicles, such as pickups or ATVs, have used hoists or mobile cranes, which are designed for substantially heavy loads. These systems are typically secured to the vehicles a semi-permanent or permanent fashion and require the distribution of the weight load over the support structure of the vehicle in order to avoid imbalance while hoisting the particular load. In addition, these systems lack the ability for extended transportation of the game animal in the hoisted position. These types of systems suffer from the drawbacks that they are bulky, lack portability, are difficult to install, are expensive and have limited use, limiting them essentially to only in-field use.

What is needed is a portable lifting device that can easily and quickly be installed onto vehicles to allow easy lifting and/or stowing of loads, such as game animals, that does not suffer from the drawbacks of the prior art. Other features and advantages will be made apparent from the present specification. The teachings disclosed extend to those embodiments that fall within the scope of the claims, regardless of whether they accomplish one or more of the aforementioned needs.

SUMMARY OF THE INVENTION

The game lifting device according to embodiments of the present disclosure include a portable, easily disassembled and stowable system for lifting loads, such as game animals, that can be detachably engaged to a vehicle and utilizes a pulley assembly and lift arm to lift a load into either a stowed position or to deliver the load to the vehicle.

An embodiment of the present disclosure includes a portable game lifting device. The game lifting device includes a receiver element for engagement with a vehicle. The receiver element includes a first end and a second end. A lift arm is pivotably attached to the first end of the receiver element via a pivot. A basket is mounted on a distal end of the lift arm from the pivot. The basket is configured to receive a load, and a pulley assembly is arranged and disposed to actuate the lift arm to lift the load with the basket.

Another embodiment of the present disclosure includes a method of lifting game. The method includes providing a portable game lifting device including a receiver element for engagement with a vehicle. The receiver element includes a first end and a second end. A lift arm is pivotably attached to at the first end of the receiver element via a pivot. A basket is mounted on a distal end of the lift arm from the pivot. The basket is configured to receive a load, and a pulley assembly is arranged and disposed to actuate the lift arm. The load is positioned into the basket and the lift arm is actuated with the pulley assembly to lift the load with the basket.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

Wherever possible, the same reference numbers will be used throughout the drawings to represent the same parts.

DETAILED DESCRIPTION OF THE INVENTION

The game lifting device according to the present disclosure is a portable, easily disassembled and stowable system for lifting loads (e.g., deer, bear, log, equipment or other article for lifting), that can be detachably engaged to a vehicle and utilizes a pulley assembly and lift arm to lift a load into either a stowed position or deliver the load to the vehicle. The game lifting device according to the present disclosure is capable of lifting a large, heavy, and/or awkward load typically requiring 2 to 3 people to lift and/or load into vehicle. The game lifting device can also safely unload those items. In addition, the game lifting device according to the present disclosure is capable of attaching to essentially any vehicle. In one embodiment, the game lifting device is detachably mounted on the receiver (e.g., a 2-inch receiver) of a vehicle, such as a pick-up truck. In one embodiment, the game lifting device according to the present disclosure is a vehicle-mountable game animal lift device capable of holding and transporting the weight of a large animal, such as a large deer, elk, bear or other game animal, while travelling through rough, uneven terrain. In addition to game animals, the game lifting device may be used lift essentially any load, within the vehicle's weight class, off ground to be carried or loaded onto essentially any type of vehicle. The game lifting device is portable and is easily installed onto vehicles so that the loads may be easily and quickly loaded onto the vehicle or otherwise stowed in the game lifting device for transportation of the load.

Figure 1:
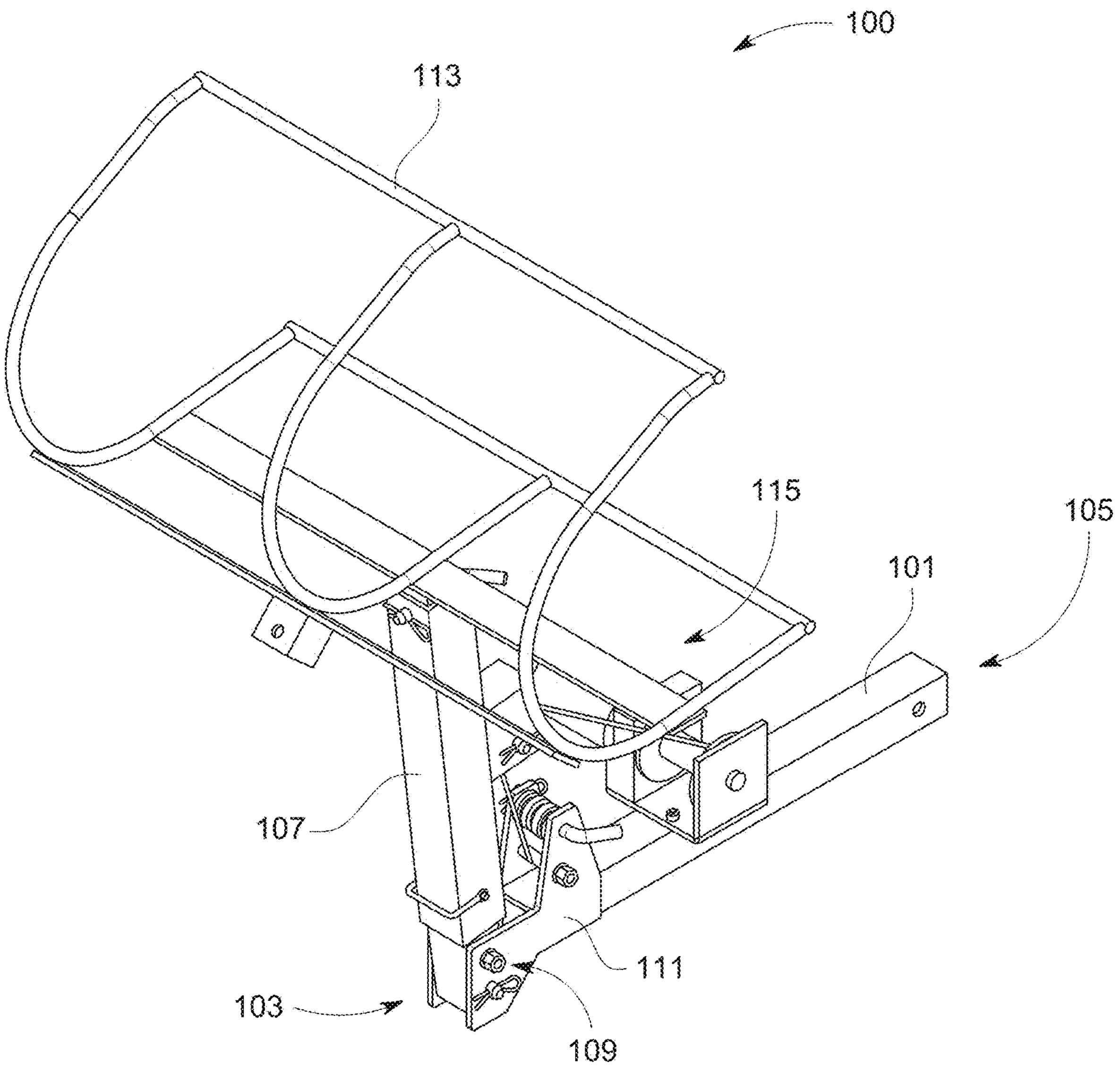
FIG. 1 shows a perspective view of a game lifting device according to an embodiment of the present disclosure.
Figure 2:
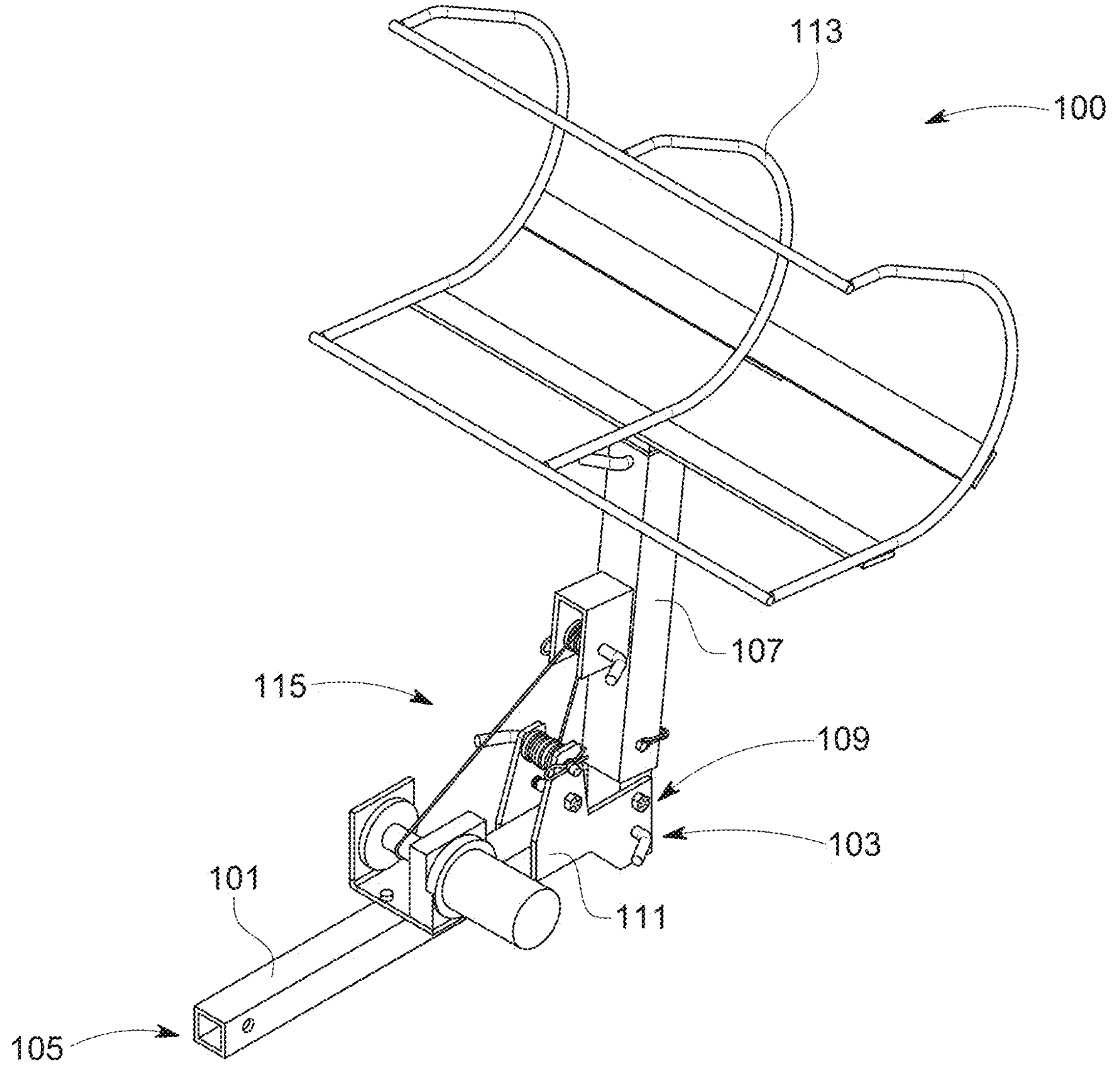
FIG. 2 shows a perspective view of the game lifting device of FIG. 1 rotated 180 degrees.

FIGS. 1 and 2 show a portable game lifting device 100 having a receiving element 101 for detachable engagement with or mounting on a vehicle (not shown in FIGS. 1 and 2). The receiver element 101 includes a first end 103 and a second end 105 distal to the first end 103. A lift arm 107 is pivotably attached to at the first end 103 of the receiver element 101 via a pivot 109. The pivot may be any structure or mechanical arrangement that permits a pivoting motion between the receiver element 101 and the lift arm 107. As shown in FIGS. 1 and 2, the pivot 109 includes a shaft that extends through the support element 111 and the lift arm 107 that supports and permits the pivoting movement of the lift arm 107 with respect to the receiver element 101. The receiving element 101 and the lift arm 107 may be fabricated from, for example, square stock metal materials, such as steel or aluminum. While not so limited, in the embodiment shown in FIGS. 1 and 2, the lift arm 107 and the pivot 109 are connected to the receiver element 101 by a support element 111 attached to the first end 103. Support element 111 includes plates, or other mechanical structures, fastened to receiver element 101 to provide additional support and functionality. For example, support element 111 may include mounting structures of sheaves and/or openings to install locking structures. A basket 113 is detachably mounted on a distal end of the lift arm 107 from the pivot 109. The basket 113 includes a geometry that permits the retention and lifting of a load 505 (see, for example, FIGS. 5-8). While not so limited, the basket 113 may be formed of round rod and/or flat bar material made of metal, such as steel or aluminum. The configuration of basket 113 is not limited to the configurations shown in FIGS. 1-8 and may include any geometry and configuration suitable for lifting a load 505, such as a game animal. To provide the lifting and pivoting of lift arm 107, a pulley assembly 115 is arranged and disposed to actuate the lift arm 107, which results in lifting of a load with the basket 113.

Figure 3:
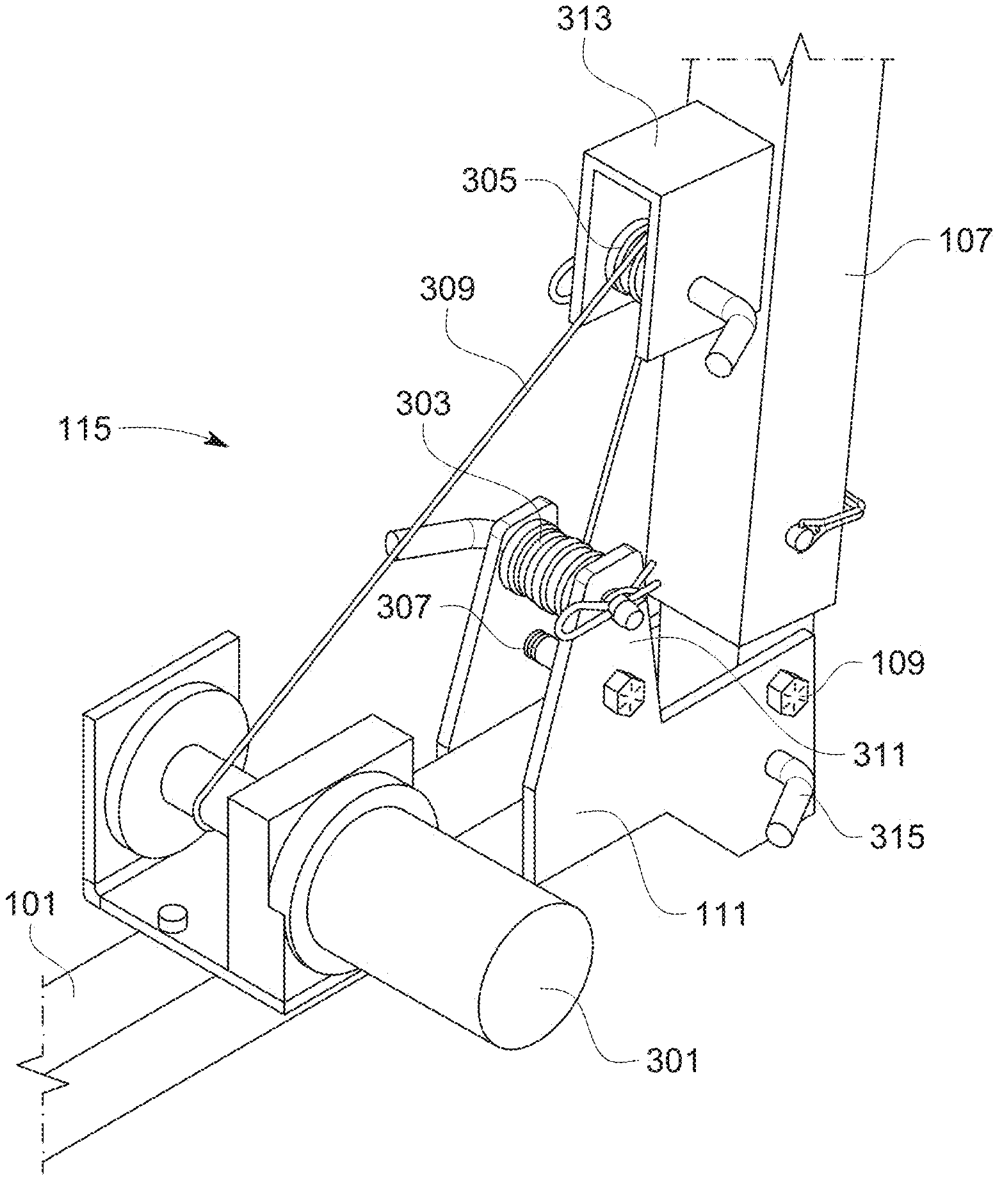
FIG. 3 shows an enlarged pulley assembly from FIG. 2 according to an embodiment of the present disclosure.

FIG. 3 shows an enlarged view of the pulley assembly 115 of FIG. 2. As seen in FIG. 3, the pulley assembly 115 includes a winch 301 mounted on the receiver element 101. Winch 301 may include any suitable winch device that is capable of drawing in flexible members, such as drawing in a flexible member on a drum, to create a force that may be used to facilitate the pivoting of lift arm 107. While not so limited, a suitable winch device for winch 301 includes a BADLANDS® ZXR2500 winch available from Harbor Freight Tools USA, Inc. The winch power source may be powered by a battery, for example a 12-volt battery, or may be powered directly by the vehicle or other external power source. In one embodiment, the power source may include a connection to a transporting vehicle battery directly or by clips. Winch 301 may be operated by remote or hand help control. In other embodiment, winch 301 may be an unpowered winch that may be operated manually by hand. The pulley assembly further includes first sheave 303 mounted on the receiver element 101 and a second sheave 305 mounted on the lift arm 107. A flexible lift member 309 is operably connected to the winch 301, the first sheave 303, the second sheave 305 and the anchor element 307 to actuate the lift arm 107. In one embodiment, the flexible lift member 309 is spooled onto winch 301 and extends to and over second sheave 305, extending to and secured to anchor element 307. While anchor element 307 is shown as a pin-like structure, the disclosure is not so limited. Anchor element 307 may be any suitable structure for anchoring and securing a portion of flexible lift member 309. In addition, the anchor element 307 may be integrally formed into other components, such as the receiving element 101 or winch 301. The flexible lift member 309 may be secured by any suitable securing technique. For example, the flexible lift member 309 may be wrapped around, fastened to, adhered to, mechanically locked or otherwise anchored to anchor element 307. The first sheave 303 is positioned to receive flexible lift member 309 upon pivoting of lift arm 107, particularly when the basket 113 is lowered below the receiver element 101. The first sheave 303 facilitates and supports the lifting of basket 113 by redirecting and protecting the flexible lift member 309. The arrangement of flexible lift member 309, winch 301, first sheave 303, second sheave 305 and anchor element 307 increases the amount of weight that can be lifted, versus the lifting capability of winch 301 alone. The flexible lift member 309 may be any suitable flexible structure for use with the winch 301 and the first sheave 303 and second sheave 305. Suitable structures for use with the flexible lift member 309 include, but are not limited to wires, cable, rope, belts or other flexible structures. In one embodiment, the flexible lift member is a metal cable.

The pulley assembly 115 includes mounting structures for each of the first sheave 303 and the second sheave 305. The first sheave 303 is rotatably mounted within first sheave mount 311. While not so limited, first sheave mount 311 may be integrated into the support element 111, as shown in the embodiment shown in FIGS. 1-4. In other embodiments, the first sheave mount 311 may also be mounted in other locations, for example, directly onto the receiver element 101 or at location along the lift arm 107. In addition, the second sheave 305 is rotatably mounted within second sheave mount 313 on the lift arm 107. Like the first sheave mount 311, the second sheave mount 313 may be mounted in other locations within the game lifting device 100 that provide the mechanical advantage, such as other locations along the lift arm 107.

Also, as best visible in FIG. 3, this embodiment of the game lifting device 100 includes a locking pin 315. Locking pin 315 passes through openings in the support element 111 and the lift arm 107 (not visible in FIG. 3) to secure the lift arm 107 in position and prevent the lift arm 107 from further pivoting motion. While the embodiment shown includes a locking pin 315 to fix the lift arm 107 into a fixed position, other mechanisms or devices may be used to lock the lift arm 107 into a position. In addition, multiple, spaced openings may be utilized with locking pin 315 to provide a plurality of fixed positions to retain the lift arm 107 at a desired angle.

Figure 4:
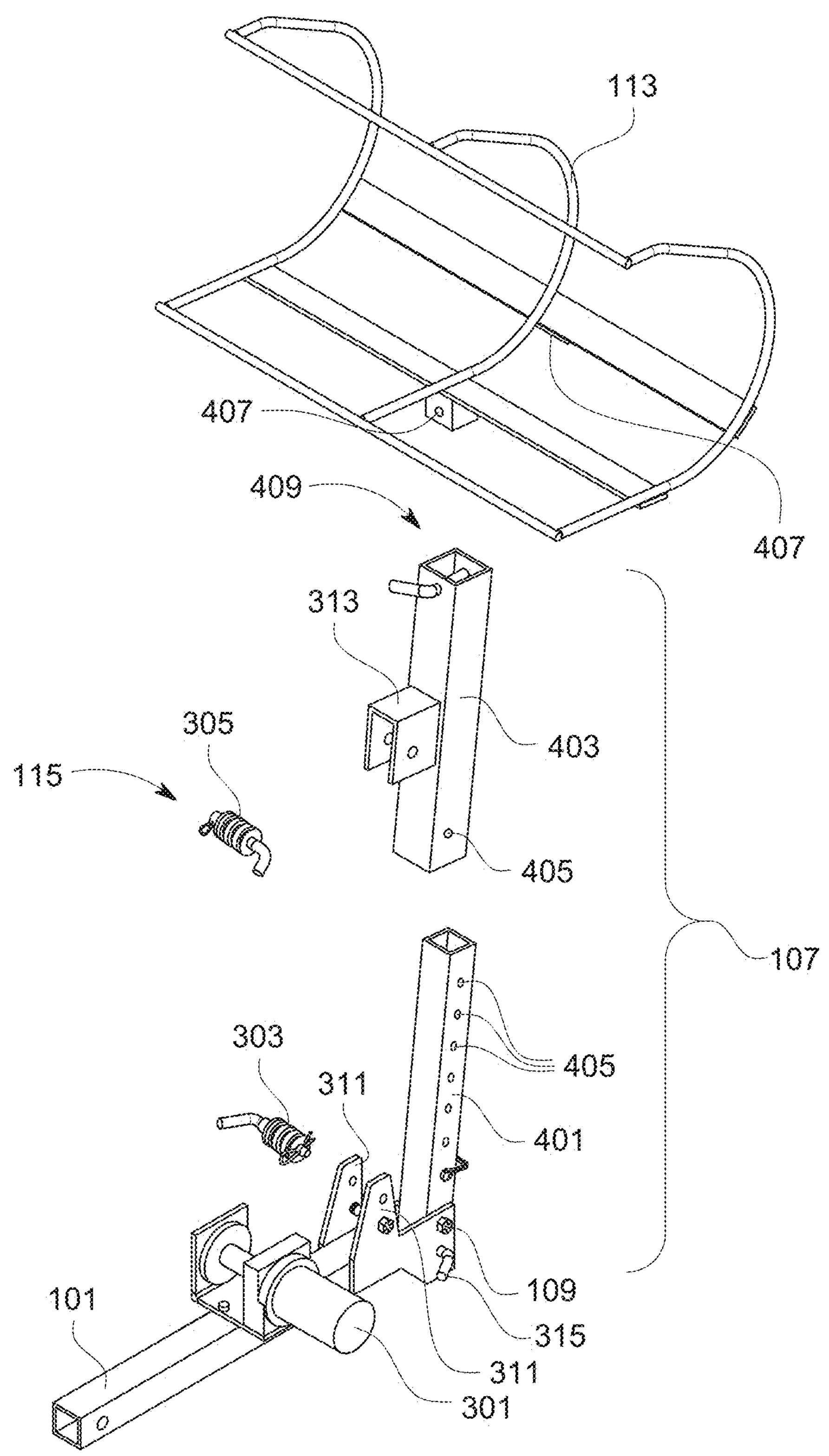
FIG. 4 shows an exploded view of a game lifting device according to an embodiment of the present disclosure.

FIG. 4 shows an exploded view of the portable game lifting device 100 according to the present disclosure. The exploded view illustrates that the various components, including the lift arm 107, the basket 113, the receiver element 101 and the components of the pulley assembly 115 may be broken down and/or stowed for easy storage and/or transportation. In addition, as shown in FIG. 4, lift arm 107 includes multiple components, including a base arm 401 and an extension arm 403. The extension arm 403 may be selectively engaged to the base arm 401 to adjust the length of the lift arm 107. For example, the base arm 401 includes openings 405 at spaced intervals along its length. The extension arm 403 includes a corresponding opening 405 at a location that permits passage of a pin or other structure through the corresponding opening and the desired opening of the base arm 401. The insertion of the pin through the extension arm 403 and the base arm 401 permits custom, variable selection of the length of lift arm 107, to meet the needed length to lift and/or stow a load 505. In another embodiments, such as the embodiments shown in FIGS. 5-8, openings 405 are spaced along the extension arm 403 and the base arm 401 includes a single opening 405 to provide the adjustable length for lift arm 107.

Also visible in FIG. 4, basket 113 includes basket receptacles 407. Basket receptacle 407 has a geometry that is detachably engageable with a basket receiver 409 at an end of the lift arm 107. Basket 113 may include one or any other number of basket receptacles 407. As shown in FIG. 4, a pin passing through an opening in lift arm 107 may be used to detachably engage and retain the basket receptacle 407 into basket receiver 409. In addition, basket 113 may include any number of basket receptacle 407 that correspond with a desired orientation with respect to lift arm 107 upon engagement of the basket receptacle 407 with basket receiver 409. In one embodiment, the basket receptacle 407, when engaged with the basket receiver 409, may correspond to a lifting orientation and a second basket receptacle 407 may correspond to a stowed or transportation orientation. While the embodiment shown in FIGS. 1-8 include two basket receptacles 407, the disclosure is not so limited and may include any number of basket receptacles 407 that provide the desired orientations.

FIGS. 5-8 illustrate the process of operating a game lifting device 100 according to an embodiment of the present disclosure. As shown and described with respect to FIGS. 1-3, a game lifting device 100 is mounted on a vehicle 501 via a receiver 503. Receiver 503 may be any suitable connection to a vehicle, such as a 1.25", 2", 2.5" 3" hitch receiver. While the embodiment shown in FIGS. 5-8 includes the receiver element 101 being a square tubing engaged with receiver 503, the disclosure is not so limited and may include any suitable connections, such as flat, round, or other geometry connectors, and/or attachment mechanism. The vehicle 501 is shown as including a tailgate 507, such as with a pick-up or similar vehicle. In this embodiment, the receiving element 101 is sized to allow extension of the game lifting device 100 to a position beyond the end of the tailgate 507. That is, the game lifting device 100 according to the present disclosure is capable of being operated while the tailgate 507 is in the open position. Although FIGS. 5-8 show a tailgate 507, the disclosure is not so limited and the game lifting device 100 may be used with any suitable receiver 503 with vehicles 501 having tailgates 503 or vehicles that do not have tailgates 503. Likewise, vehicle 501 may be an off-road vehicle, ATV, side by side, golf cart or any other vehicle capable of carrying the load 505 lifted by the game lifting device 100.

As described above with respect to FIGS. 1-4, the pulley assembly 115 includes a winch 301 mounted on the receiver element 101. In addition, a first sheave 303 is mounted on the receiver element 101 and a second sheave 305 is mounted on the lift arm 107. An anchor element 307 and a flexible lift member 309 are operably connected to the winch 301, the first sheave 303, the second sheave 305 and the anchor element 307 to actuate the lift arm 107. The lift arm 107 is sufficiently actuatable to lift the load 505 with the basket 113 into a storage position or a position that delivers the load to (e.g., onto or into) the vehicle.

Figure 5:
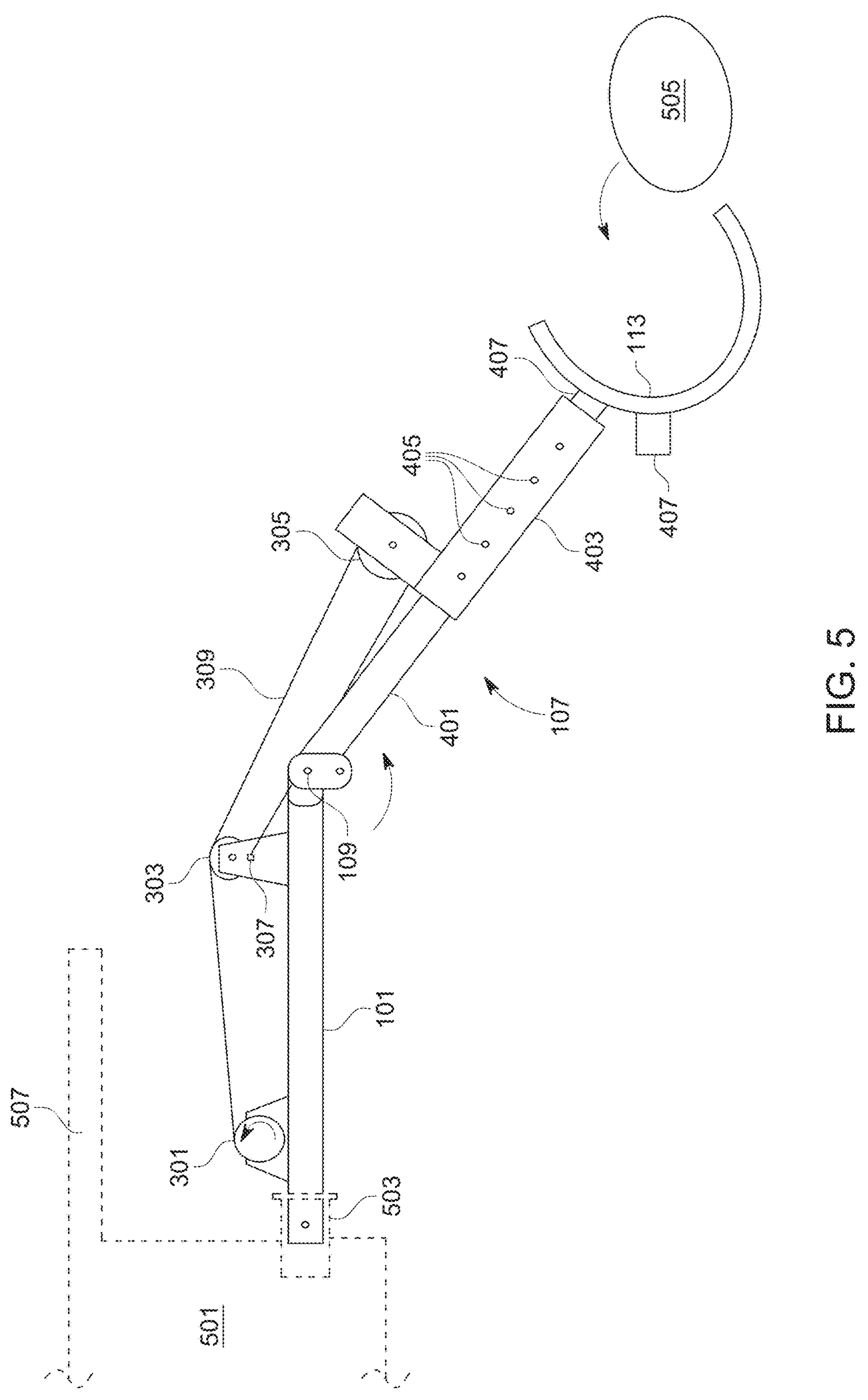
FIGS. 5-7 show a schematic view of the operation of a game lifting device according to an embodiment of the present disclosure.
Figure 6:
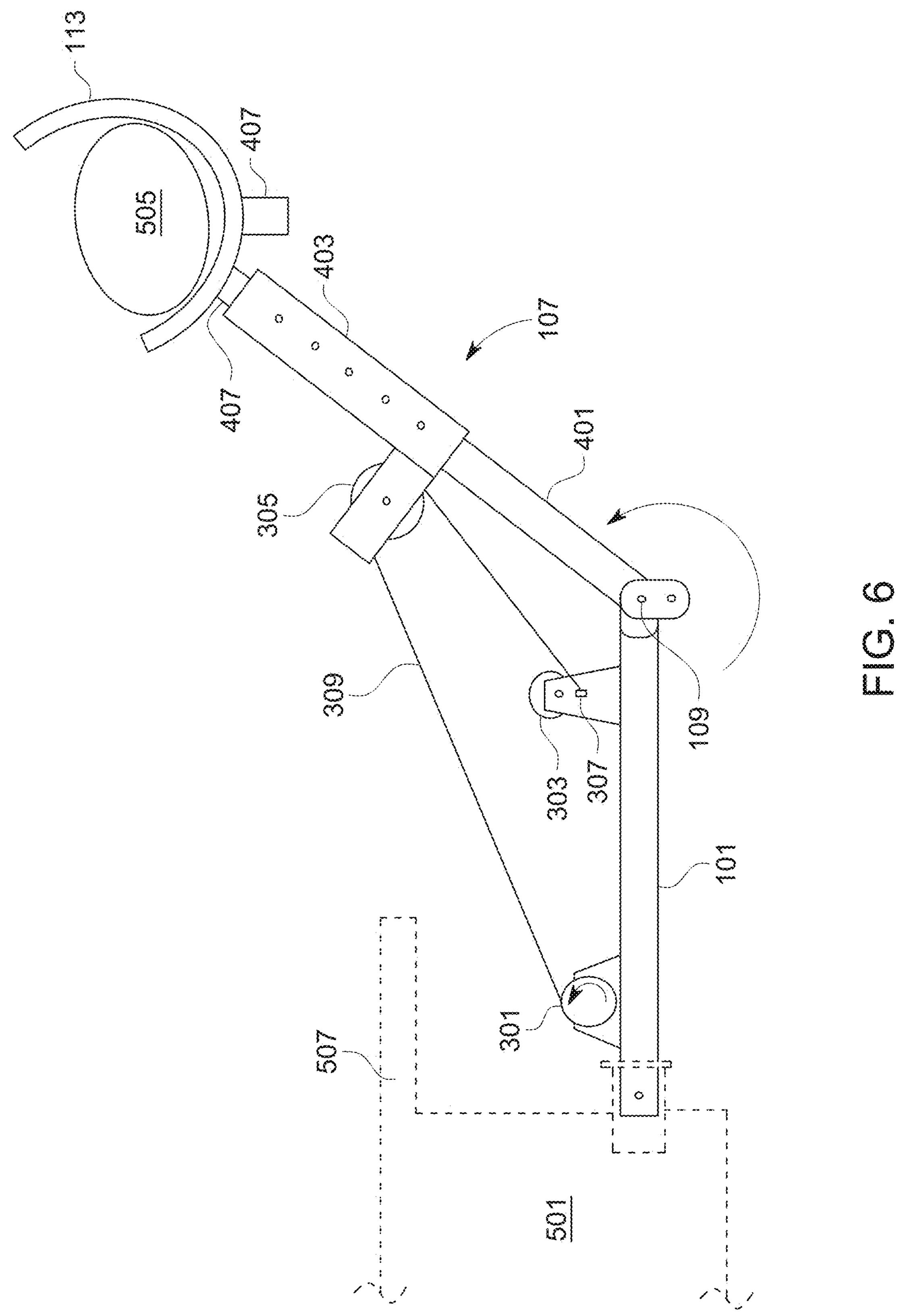
Figure 7:
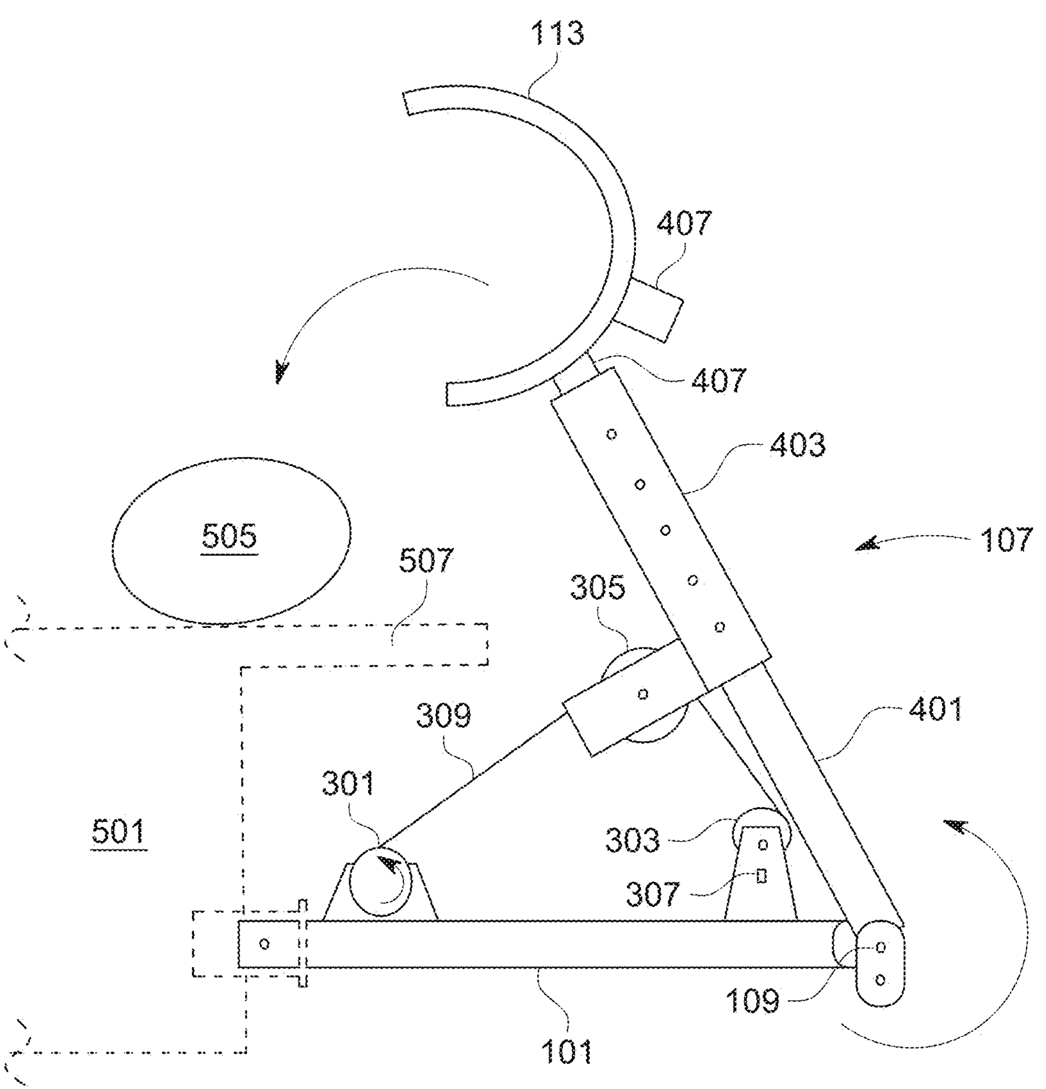

As shown in FIG. 5, the game lifting device 100 is extended such the lift arm 107 is pivoted outwardly away from the vehicle 501 in proximity of load 505. In addition, as shown in FIG. 5, the flexible lift member 309 extends over and is supported by an upper portion of first sheave 303. The flexible lift member 309 is redirected and supported by first sheave 303 to facilitate the pivoting of lift arm 107 and lifting of load 505. Load 505 is positioned into basket 113 and winch 301 is activated to start the process of lifting load 505. The positioning of load 505 into the basket 113 may be accomplished by any suitable technique, such as sliding or lifting, with or without tools, into the basket 113. The rotation of the drum of winch 301 draws in flexible lift member 309 and actuates the pivoting motion of lift arm 107. FIG. 6 illustrates an intermediate position where load 505 has been lifted from the ground and the lift arm 107 continues to pivot, bringing the basket 113 and the load 505 toward vehicle 501. FIG. 7 shows a delivery position for the game lifting device 100, wherein the load 505 is delivered to (e.g., onto or into) vehicle 501. As shown in FIG. 5, the pivoting of lift arm 107, urged by the drawing in of the flexible lift member 309 by winch 301. Once the basket 113 is positioned above the vehicle 501, the load 505 may be rolled, slid or otherwise moved, with or without tools, into or onto the vehicle 501. In other embodiments, the load 505 may be rolled, slid or otherwise moved by the action of gravity to delivery the load 505 to the vehicle 501. Unloading of load 505 may be accomplished by reversing the process and deploying flexible lift member 309 from winch 301 and allowing the lift arm 107 to pivot away from vehicle 501.

Figure 8:
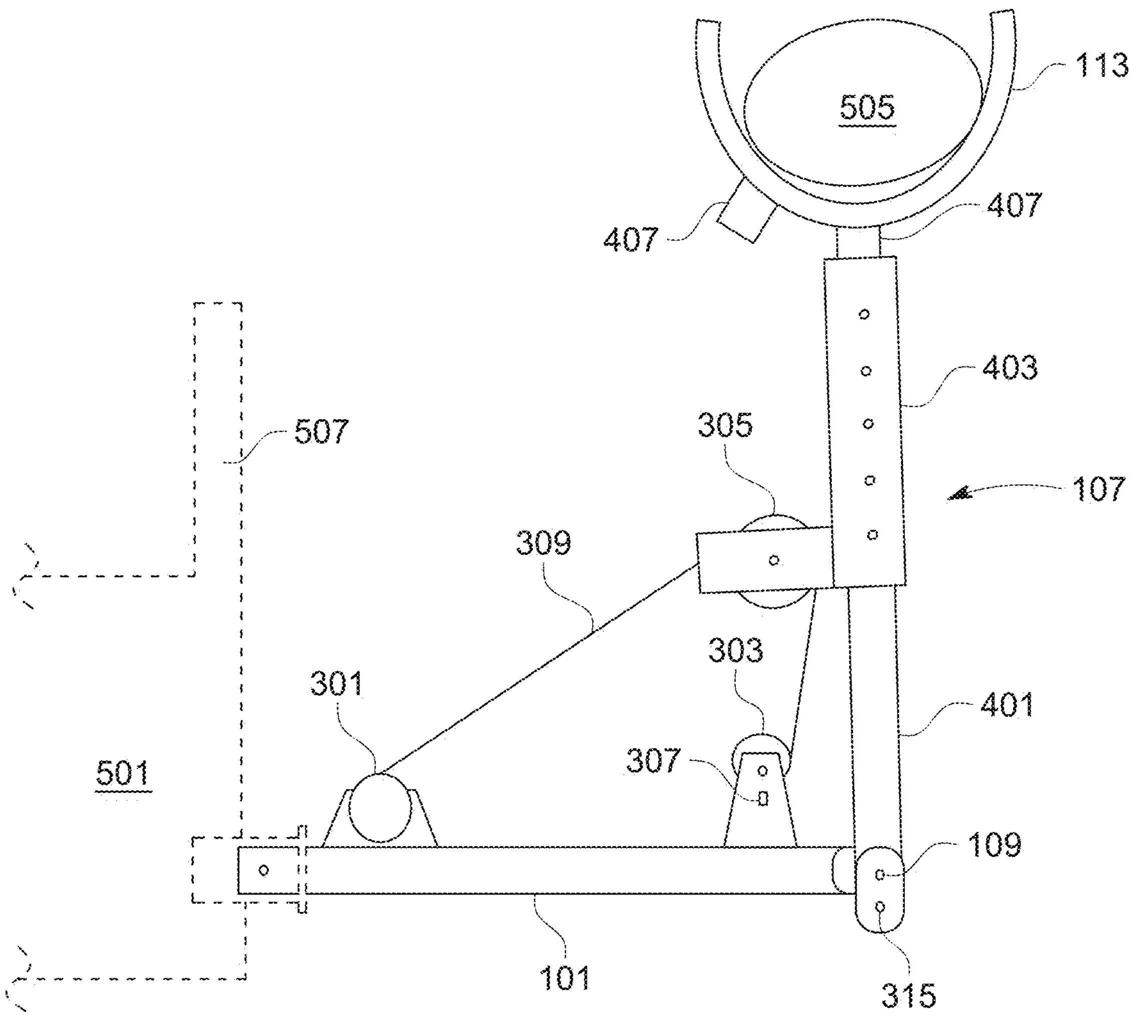
FIG. 8 show a schematic view of the basked of a game lifting device according to an embodiment of the present disclosure in a stowed position.

FIG. 8 shows and alternate embodiment of operation of the game lifting device 100 according to the present disclosure, wherein the lift arm 107 is pivoted into a stowed, carry and/or transportation position, where the basket 113 is rotated and retained at the alternate basket receptacle 407. The lift arm 107 may be pinned, such as with a locking pin 315, or otherwise secured into position, for example, with insertion of locking pin 315 through lift arm 107. In addition, if desired, load 505 and the corresponding portion of the game lifting device 100 may be covered to conceal the load, which may be desirable if the load 505 is a game animal and observers may find the uncovered load 505 undesirable. In contrast to the embodiment shown in FIGS. 5-7, the embodiment of FIG. 8 shows the basket 113 is an alternate orientation. To modify the orientation of the basket 113, basket 113 is detached from basket receiver 409 of lift arm 107 at a first basket receptable 407 and detachably engaged with a second basket receptacle 407. In this embodiment, the orientation of the basket 113 holds the load 505 into a stowed position, rather than a position that permits delivery of the load 505 to the vehicle 501. However, other orientations, corresponding to positions of other basket receptacles 407 on basket 113 may be utilized.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A method for lifting a load comprising:

providing a portable game lifting device comprising:

a receiver element for engagement with a vehicle, the receiver element having a first end and a second end;

a lift arm pivotably attached to the first end of the receiver element via a pivot;

a basket mounted on a distal end of the lift arm from the pivot, the basket being configured to receive a load; and a pulley assembly arranged and disposed to actuate the lift arm;

positioning the load into the basket;

wherein the lift arm includes a base arm and an extension arm, the extension arm being selectively engaged to the base arm to adjust the length of the lift arm, with each of the base arm and the extension arm including an opening arranged and disposed to permit passage of a pin and one or both of the base arm and the extension arm having additional openings to secure the length of the lift arm by passage of the pin;

actuating the lift arm with the pulley assembly to lift a load with the basket; and modifying the orientation of the basket by detaching the basket at a first receptable and detachably engaging the basket with a second receptacle.

2. The method of claim 1, wherein the pulley assembly comprises:

a winch mounted on the receiver element;

a first sheave mounted on the receiver element;

a second sheave mounted on the lift arm;

an anchor element; and a flexible lift member arranged on the winch, the second sheave and the anchor element to actuate the lift arm.

3. The method of claim 2, further selectively contacting and redirecting the flexible lift member with the first sheave.

4. The method of claim 2, wherein the flexible lift member is a metal cable.

5. The method of claim 1, wherein the providing a portable game lifting device includes detachably engaging the receiver element of the game lifting device into a receiver of a vehicle.

6. The method of claim 1, wherein the load is a game animal.

7. The method of claim 1, wherein the actuating lifts the load in the basket into a storage position or a position that delivers the load to the vehicle.

8. The method of claim 1, wherein the providing a portable game lifting device includes detachably engaging the second end of the receiver element with a receiver of a vehicle.

9. The method of claim 1, further comprising detachably engaging the basket to the lift arm.

10. A portable game lifting device comprising:

a receiver element for engagement with a vehicle, the receiver element having a first end and a second end;

a lift arm pivotably attached to the first end of the receiver element via a pivot;

a basket mounted on a distal end of the lift arm from the pivot, the basket being configured to receive a load; and a pulley assembly arranged and disposed to actuate the lift arm to lift the load with the basket;

wherein the basket includes a plurality of basket receptacles, each basket receptacle corresponding to a basket orientation when detachably engaged to the lift arm.

11. The portable game lifting device of claim 10, wherein the pulley assembly comprises:

a winch mounted on the receiver element;

a first sheave mounted on the receiver element;

a second sheave mounted on the lift arm;

an anchor element; and a flexible lift member operably arranged on the winch, the second sheave and the anchor element to actuate the lift arm.

12. The portable game lifting device of claim 11, wherein the flexible lift member is a metal cable.

13. The portable game lifting device of claim 10, wherein the load is a game animal.

14. The portable game lifting device of claim 10, wherein the lift arm is sufficiently actuatable to lift the load with the basket into a storage position or a position that delivers the load onto the vehicle.

15. The portable game lifting device of claim 10, wherein the second end of the receiver element is configured to detachably engage a receiver of a vehicle.

16. The portable game lifting device of claim 10, wherein the basket is detachably engageable to the lift arm.

17. The portable game lifting device of claim 10, wherein the lift arm includes a base arm and an extension arm, the extension arm being selectively engaged to the base arm to adjust the length of the lift arm.

* * * * *